July 1, 1924.
G. W. LYNCH
EXPLOSION ENGINE PISTON
Filed Oct. 23, 1922
1,499,992
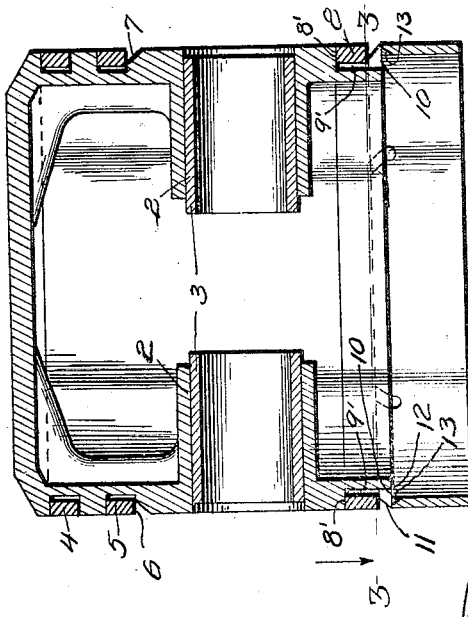
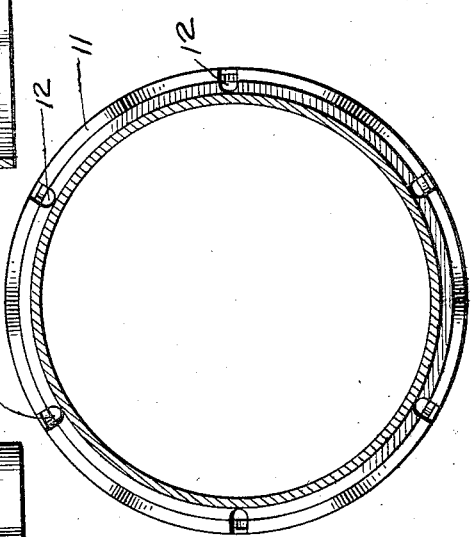
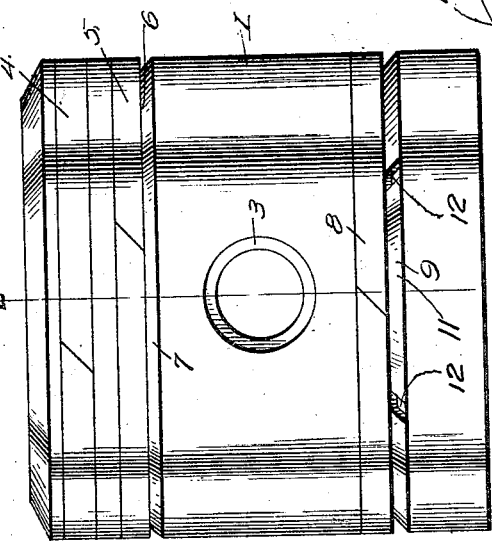
Gilbert W. Lynch, INVENTOR.
BY
Geo. P. Kimmel.
ATTORNEY.

Patented July 1, 1924.

1,499,992

UNITED STATES PATENT OFFICE.

GILBERT W. LYNCH, OF MORGANTOWN, WEST VIRGINIA.

EXPLOSION-ENGINE PISTON.

Application filed October 23, 1922. Serial No. 596,307.

*To all whom it may concern:*

Be it known that I, GILBERT W. LYNCH, a citizen of the United States, residing at Morgantown, in the county of Monongalia and State of West Virginia, have invented certain new and useful Improvements in Explosion-Engine Pistons, of which the following is a specification.

This invention has reference to improvements in explosion engine pistons, and its object is to provide a piston of a character which will prevent oil pumping with its attendant evils.

The invention relates particularly to the type of explosion engine used on the Ford automobile but is not necessarily confined to such particular type of engine.

In accordance with the invention, the piston is provided with two closely associated and longitudinally spaced grooves above the wrist pin position and one groove below the wrist pin position, this disposition being the arrangement usually employed in the type of automobile to which the invention relates.

The uppermost groove is a plain groove, while the other two grooves, one above and the other below the wrist pin position, are undercut bevelled rings, providing scraping edges for preventing the creeping of oil above the respective rings, while the lowermost groove and the underlying beveled portion of the wall of the cylinder forming a pocket, is provided with ducts leading through the wall of the cylinder to the interior thereof whereby the collected oil is discharged into the interior of the piston and so disposed of.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:—

Figure 1 is a side elevation of an engine piston constructed in accordance with the invention.

Fig. 2 is a section on the line 2—2 of Fig. 1.

Fig. 3 is a cross section on the line 3—3 of Fig. 2.

Referring to the drawings, there is shown a piston 1 following generally the lines of explosion engine practice and conforming in general to the structure of the Ford automobile engine.

The piston is hollow as usual and is formed at a point about midway of its height with diametric passages 2 for the reception of bushings 3 for carrying the wrist pin of the piston.

In the upper ring groove, there is a plain ring 4 of the divided or split type, and in the next lower groove there is located a ring 5 of similar shape but having a lower wall 6 overhanging an outwardly bevelled portion 7 of the groove in which the ring 5 is lodged. As the ring 5 moves downwardly in the cylinder, the lower edge of the ring, because of the bevelled portion 7 gathers the oil distributed on the walls of the cylinder and so directed into the groove containing the ring 5, the bevelled wall 7 facilitating this action.

In the lowermost groove, there is located a third ring 8, similar to the ring 5. This groove has an upper wall 8', a rear vertical wall 9' and a lower wall 10, which is of less width than the upper wall and continues outwardly at a bevel, as at 11, upon which beveled surface, oil distributed along the walls of the cylinder, is collected. However, this collected oil does not pocket in the groove but finds escape through passages 12, which are cut from the outer terminus of the beveled portion to a point in the vertical plane with the vertical wall 9' and open into the interior of the piston. Extending upwardly and outwardly from the inner face of the piston wall are a series of semi-circular grooves 13, each communicating with one of the passages 12.

The construction of the piston is such as to eliminate oil pumping, whereby the oil is prevented from finding its way up past the piston into the spark plug chamber and so short circuiting the spark plug. The action also reduces the amount of oil used from the original use down to about one-third the amount.

Because of the elimination of oil pumping the formation of carbon is also materially reduced. Moreover, the consumption of gasoline is cut down because of the reduction in the amount of oil accumulating in the engine head.

What is claimed is:—

1. A piston having its body portion formed with a peripheral piston ring receiving groove, said groove having an upper, an inner vertical and a lower wall, said lower wall having its inner portion parallel to said upper wall and its outer portion bevelled and with its outer terminus spaced a greater distance from the upper wall than the inner terminus thereof, said lower wall having a plurality of radially disposed passages cut from the outer terminus of the bevelled portion inward to a point parallel with the said vertical wall, and communicating with the interior of the piston body, and said body portion having its inner face below said groove formed with semi-circular channels extending upwardly and outwardly and communicating with said passages.

2. A piston having its body portion formed with a peripheral piston ring receiving groove, said groove having an upper, an inner vertical and a lower wall, said lower wall having its inner portion parallel to said upper wall and its outer portion bevelled and with its outer terminus spaced a greater distance from the upper wall than the inner terminus thereof, said lower wall having a plurality of radially disposed passages cut from the outer terminus of the bevelled portion inward to a point parallel with said vertical wall, and communicating with the interior of the piston body, and with the inner vertical wall of each passage flush with the inner wall of said groove, and said body portion having its inner face below said groove formed with semi-circular channels extending upwardly and outwardly and communicating with said passages.

In testimony whereof, I affix my signature hereto.

GILBERT W. LYNCH.